R. J. LESSOR & J. B. SHAMBO.
Securing Wheels to Axles.
No. 141,570.  Patented August 5, 1873.
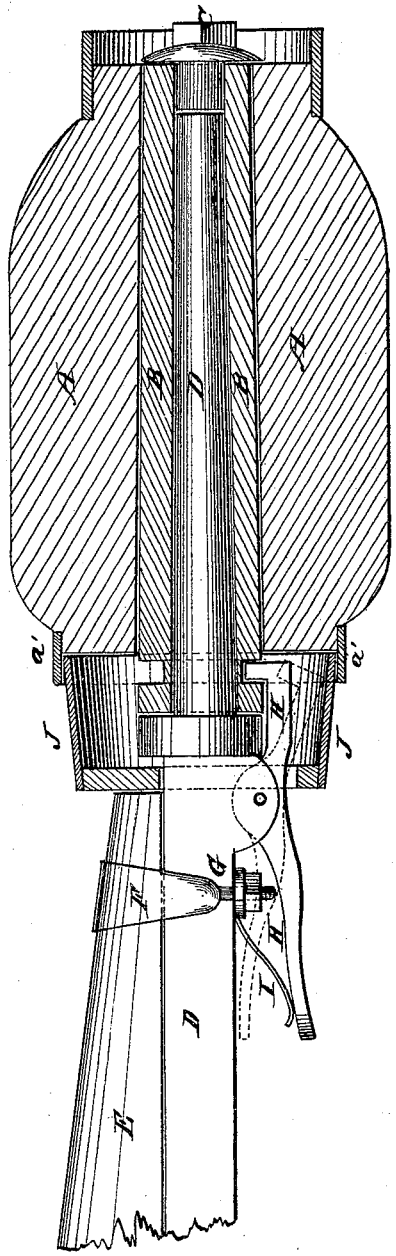

UNITED STATES PATENT OFFICE.

ROBERT J. LESSOR AND JOHN B. SHAMBO, OF BRANDON, VERMONT.

IMPROVEMENT IN SECURING WHEELS TO AXLES.

Specification forming part of Letters Patent No. 141,570, dated August 5, 1873; application filed March 15, 1873.

*To all whom it may concern:*

Be it known that we, ROBERT J. LESSOR and JOHN B. SHAMBO, of Brandon, in the county of Rutland and State of Vermont, have invented a new and useful Improvement in Securing Wheels to Axles, of which the following is a specification:

The figure is a detail sectional view illustrating the construction and use of our improvement.

Our invention has for its object to furnish an improvement in securing wheels to axles, by the use of which the wheels will be held securely in place, and which will enable the wheels to be quickly and easily removed from and placed upon the axles, when it may be necessary to oil the said axles. The invention consists in the hook-lever in combination with the axle, the hub, and the grooved projecting end of the axle-box; and in the combination of the mud band or cap with the axle, the hub, the hook-lever, and the grooved projecting end of the axle-box, as hereinafter fully described.

A is the hub. B is the axle-box, which is driven into the hub A in the ordinary manner, and which is secured in place by a nut, C, screwed into its outer end, and which overlaps the end of the hub A. The nut C may be made in the form of a cap-nut to cover the outer end of the hub A, if desired. The inner end of the axle-box B projects beyond the inner end of the hub A, and has a ring-groove formed in its outer surface. D is the axle, the journal of which fits into the axle-box B, the collar of the said axle resting against the inner end of the said axle-box. The axle D is secured to the stock E by a clip, F, and yoke G in the ordinary manner. H is a lever, which is pivoted to ears formed upon the axle D or clip-yoke G. Upon the inner end of the lever H is formed a lip or straight hook, which fits into the ring-groove of the axle-box B. The lip or hook of the lever H is held in the groove of the axle-box B by the spring I, which is secured to the axle D by the yoke G, and the free end of which presses against the outer end of the said lever H, as shown in the figure.

By this construction the wheel will be held securely upon the axle and held in such a way that the said wheel may be easily and quickly detached when required for oiling the axle or other desired purpose.

The hook end of the lever H, the collar of the axle D, and the grooved end of the axle-box B are covered and protected from mud, dust, &c., by a band or cap, J, attached to the said axle, and which underlaps the ordinary mud-band a' of the hub A, as shown in the drawing.

Having thus described our invention, we claim as new and desire to secure by Letters Patent—

1. The hook-lever H, in combination with the axle D, hub A, and grooved projecting end of the axle-box B, substantially as herein shown and described, and for the purpose set forth.

2. The combination of the sand band or cap J with the axle D, hub A, hook-lever H, and grooved projecting end of the axle-box B, substantially as herein shown and described, and for the purpose set forth.

ROBERT J. LESSOR.
JOHN B. SHAMBO.

Witnesses:
 FRANK PLUMLEY,
 CARLOS C. DAVIS.